Patented May 22, 1951

2,553,588

UNITED STATES PATENT OFFICE 2,553,588

MINERAL OIL LUBRICANT CONTAINING ALKYL KETONE-P2S5 REACTION PRODUCT

Everett C. Hughes, Cleveland Heights, Ohio, assignor to The Standard Oil Company, Cleveland, Ohio, a corporation of Ohio No Drawing. Application August 27, 1946, Serial No. 693,381

4 Claims. (Cl. 252—46.6)

This invention relates to lubricants and lubricant additives suitable for use under various conditions including high temperatures or high pressures, or both. As for example, use in combustion engines operating at higher temperatures and in which the lubricant is in close contact with metal surfaces, metal compounds and high temperature gases. Lubricating oils, particularly when used under higher temperature conditions are subject to break-down. When used in internal combustion engines under such conditions, the break-down is accompanied by lacquer deposition, sludge and acid formation, and a tendency to cause corrosion of the bearing and other metals with which the oils are in contact.

In order to minimize or preferably to avoid entirely serious deterioration of metal parts, particularly in internal combustion engines, it is highly desirable to use lubricants which show a minimum of, or are entirely free of the above mentioned objectionable effects.

It is an object of the present invention to provide an agent which may be usable itself as a lubricant, and when added to lubricants will markedly inhibit their objectionable characteristics such as in lubricating oils used in internal combustion engines, the deposition of lacquer, acid and sludge formation, corrosion and other types of harmful effects.

It is a further object of the invention to provide lubricating oils containing such an addition agent.

Another object of this invention is to provide heretofore unknown compositions containing elements not heretofore contained in products of this type, together with processes for their production.

Another object is to provide novel compositions which are superior in their functions to other compositions now available and intended for these same general purposes.

Other objects of this invention will be apparent as it is more fully disclosed hereinafter.

In accordance with the invention, it has been discovered that higher ketones may be reacted at higher temperatures with sulfides of phosphorus such as, for example, the readily available pentasulfide to give compositions containing phosphorus. It has further been discovered that these compositions may be further reacted with metal compounds, particularly basic metal compounds to give heretofore unknown compositions containing the combined sulfide, organic and metal radicals or residues. Good yields are obtained in both of these reaction steps.

It has also been discovered that the high temperature reaction products of phosphorus sulfide and higher organic ketones are suitable as addition agents for lubricants, and that the metal derivatives or compounds of these reaction products are especially suitable as addition agents for lubricants. When these materials are employed as addition agents for lubricants, they impart thereto markedly advantageous properties. They are suitable for use in various lubricating oils and greases, such lubricating oils and greases of the type that may be used in automotive equipment and the like and which will be referred to as vehicular lubricants. They are also suitable for use in distinctly different types of lubricants such as cutting oils.

The final metal derivative or compound is readily made in two steps, the first of which is the reaction between the sulfide and the higher ketone to give a product containing a residue of the sulfide reactant, and the second of which involves the reaction of a metal or basic metal compound with the sulfide-ketone reaction product to give a metal derivative or compound thereof containing the metal or metal compound reactant.

The sulfide-ketone reaction may be carried out with direct admixture of the reactants or by their admixture in the presence of a diluent which may or may not be subsequently removed. A volatile inert solvent such as one boiling in the heptane range may be used as a diluent which is to be subsequently removed. Alternatively, a heavier oil such as white oil, or a lubricating oil of about the same properties as that to which the new composition is to be added, may be used as a diluent which is not to be removed. If a volatile solvent is used, it may be selected so as to have a boiling point that will assist in controlling the temperature if the reaction is carried out under reflux conditions. In a commercial embodiment of the invention, a diluent probably would not be used unless it is a mineral oil, but this is not necessary.

The sulfide-ketone reaction may be carried out at a temperature over a wide range, but in general, the temperature should be at least about 400° F., at least about 425° F. being much better, desirably in the range of about 450° to 600° F., and preferably at about 500° F., at atmospheric pressure. This temperature range is referred to as the higher temperature. If desired, the reaction may be carried out at a lower temperature and the resulting product subjected to the above higher temperature treatment as explained heretofore. Economy of heat suggests that a temperature higher than that necessary to achieve the wanted reaction product will be wasteful. The temperature should not be so high as to decompose the reaction product, and 600° F. may be viewed as a practical economical upper limit, although higher temperatures produce a satisfactory product. The reaction is somewhat exothermic and on a commercial scale, the heat evolved thereby may be used to maintain the temperature. The ingredients may be added in increments if this is desirable for temperature control or for other reasons.

The reaction product obtained at temperatures somewhat below about 400° F. is waxy and tends to be insoluble or to precipitate out on standing from oil. However, the higher temperature reaction product, such as that obtained at about 500° F., is oil soluble and does not tend to precipitate out on standing. Apparently, an additional reaction occurs at above about 400° F., which has an oil-solubilizing effect.

The reaction may be completed in from a few minutes to 10 hours. The reaction time is a function of the temperature, the relative amounts of the reactants, the subdivisions thereof, rate of admixture of the reactants, the rate of agitation, etc. The reaction is usually completed in about 4 hours or less time. A sludge or insoluble material usually is formed as a by-product. This may be removed by settling, filtration or centrifuging, along with any undissolved reactants. Very good yields of the desired product are readily obtained. Mol ratios of one mol of the ketone or ketones to from 0.10 to about 2.0 or more mols of sulfide may be used. Even small amounts show significant improvements. Economic factors may make it undesirable to use more than about 2.0 mols of sulfide. Generally about 0.20 to 1.5 mols of the sulfide is the usual range that will be used.

The pentasulfide is preferred although the sesquisulfides or other sulfide or mixture of sulfides may be employed. Phosphorous pentasulfide is economical and readily available and for this reason is used for illustrative purposes.

A large variety of ketones are suitable for the reaction, for example, either aliphatic, aromatic, or mixed aliphatic-aromatic ketones including polyketones. The choice may be limited by the desired lubricant solubility characteristics of the sulfide ketone reaction product or of the final metal derivative product. Generally, higher ketones are preferred. By higher ketones is meant those having at least 12 carbon atoms in the molecule. Generally the ketone will not have more than 52 carbon atoms. Representative ketones are methyl-docecyl, xylyl-heptadecyl, dioctadecyl, diheptadecyl, ethylheptadecyl, propylheptadecyl, and hydroxyarylheptadecyl ketones. Commercial dipalmityl ketone is a readily available higher ketone and for this reason is used in many of the examples given for illustrative purposes.

The ketone stock may be a mixture of the ketones of different types of different molecular weights or both. Generally, the aliphatic or mixed aliphatic-aromatic including aliphatic-hydroxyaromatic ketones are preferred. Of the ketones containing aliphatic radicals, those with saturated aliphatic radicals are preferred. However, those with unsaturated radicals are useful. The ketone stock should contain at least 50.0% ketonic ingredients and preferably 75.0% by weight of the stock.

The sulfide-ketone reaction products may be converted to their metal derivatives or compounds by reaction with one or more metal compounds such as the sulfides, oxides and hydroxides. These metals may be one or more of the following: An alkali metal, such as sodium, potassium and lithium; an alkaline earth metal, such as calcium or barium; or aluminum or other metal lower than aluminum on the electromotive series, such as copper, tin, chromium, arsenic, antimony and molybdenum. The metal should be selected with reference to the use of the composition and the properties desired in it. The alkali and alkaline earth metal compounds have excellent detergent characteristics. The heavier metal compounds have surface corrosion inhibition characteristics. The most important metals are group I, group II and group III metals of the periodic table i. e., above manganese in the electromotive force series, such as sodium, potassium, calcium, barium and aluminum, and of these, those above aluminum in the electromotive force series are preferred.

The reaction step of forming the metal derivative or compounds may be carried out at a temperature in the range of about 100° to 600° F., a temperature of about 180° to 300° F. being preferred if the primary sulfide ketone reaction product was formed at or was subjected to the higher temperatures. If the primary sulfide ketone reaction product was formed at lower temperatures and not subsequently subjected to the higher temperature, the reaction step of forming the metal derivative may be carried out at a higher temperature such as from 425° to about 625° F., and preferably at about 500° F.; alternatively the metal derivative may be formed at a relatively lower temperature and subsequently subjected to the higher temperature. This reaction may be completed in from a few minutes to about 10 hours time and the same factors as to reaction time are involved as discussed heretofore. Usually the reaction is completed in 4 hours or less time. A diluent may be used as described heretofore, but it is not necessary. If a diluent was used in the sulfide-ketone reaction, it may be carried over into this reaction step and may be subsequently separated if desired. From about 0.25 to about 5.0 mols of the metal oxide or hydroxide may be used per mol of the sulfide used in the first reaction step. Any metal sulfides, oxides or hydroxides which remain unreacted with the sulfide-ketone reaction product or its metal derivative or the mentioned diluents are settled with any sludge which is formed as a by-product, and removed as disclosed hereinafter. Very good yields are obtained in this reaction, also.

It may be beneficial to have water present in the reaction and this may be introduced as water of crystallization or as a hydrate of the metal compound or it may be introduced separately.

A plurality of metals can be used such as sodium and calcium, calcium and barium, calcium and aluminum or tin. If the amount of metal is small the final product may be a mixture of the initial reaction product and the metal derivative. It is preferable, however, to introduce a relatively large amount of the metal residue or radical into the sulfide-ketone reaction product since the metal derivatives have the most desirable properties.

After the reaction with the metal component is complete, the reaction mass may be used as an additive but preferably it is first centrifuged or filtered to remove water, excess reactants and any oil insoluble by-product substances. If a volatile solvent was used as a diluent it may be removed by vacuum distillation. The final products are usually waxy solids at room temperature and clear colored oils at temperatures above their melting points.

These new compositions impart many desirable properties to organic compounds which are subject to oxidative deterioration, e. g. lubricants, especially oxidation inhibition. They also act as detergents and corrosion inhibitors therein. The metal derivatives are appreciably superior to the sulfide-ketone reaction products as additives for lubricants.

The amount of the above described sulfide-ketone reaction product or its metal derivative to be added to lubricating oils or greases will depend upon the characteristics of the oil or grease and the intended use. Some oils have more of a tendency to corrode metals or to form acid sludges and lacquer depositions than others and such oils require larger quantities of the addition agent. Oils that are intended for higher temperatures require larger amounts of the additive. In general the range is from about 1.0 to about 12.0%, but under some circumstances amounts as low as 0.01% show a significant improvement; and, as to an upper limit, of course, it may be uneconomical to add more than is necessary to impart to the lubricant the desired properties. Generally not over about 50.0% will be used.

In order to point out the invention more clearly and to illustrate some of its advantages, but in no wise to limit the scope of the invention as otherwise described and claimed herein, the following examples and illustrations and tables of results of tests of lubricants comprising some of the compositions in accordance with the invention are given. The additives were prepared as concentrates in oil solution. In the tested compositions, the given concentration of additive is the concentration of the additive itself, i. e., the mixture of reaction product in the oil.

*Example I*

(a) 48 grams of commercial "Palmitone," 11.1 grams of phosphorus pentasulfide and 144 grams of #225 Red Oil (a commercial acid treated Mid-Continent lube oil with an S. U. S. viscosity of 225 at 100° F.) were mixed and heated to a temperature of 500° F. with stirring for thirty minutes in an inert atmosphere. The reaction mass was filtered hot and 190 grams of a dark colored oily material was obtained.

(b) to 189 grams of the above product was added 31.5 grams of barium hydroxide octahydrate $(Ba(OH)_2.8H_2O)$. The mixture was reacted for 3 hours at a temperature of 200° F. with agitation. The mixture was then blown with air for 2 hours at a temperature of 250° F. and filtered. 182 grams of an oil solution of the barium derivative of the $P_2S_5$-Palmitone reaction product was obtained. The product analyzed 3.86% ash.

*Example II*

(a) 720 grams of dihexadecyl ketone is mixed with 1080 grams of #225 Red Oil and 1080 grams of #300 Red Oil (a commercial acid treated Mid-Continent lube oil with an S. U. S. viscosity of 300 at 100° F.). To this mixture is added 160 grams of phosphorus pentasulfide and the mixture is heated to a temperature of 500° F. and reacted at this temperature for 30 minutes in an inert atmosphere with stirring. The reaction mixture was filtered hot and a yield of 2881 grams of a dark oil was obtained.

(b) The above described reaction product or mixture was reacted with 474 grams of barium hydroxide octahydrate at a temperature of 200° F. for a period of 5½ hours. The mixture was then blown with air for 2 hours at a temperature of 250° F., following which it was filtered hot. A yield of 2628 grams was obtained and the product had the following analysis.

3.50% ash (as barium sulfate)
2.06% barium
0.89% phosphorus
2.06% sulfur

Lubricating oils containing additives of the invention were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September 1941, and in another paper by the same authors presented at the New York city meeting of the American Chemical Society in September 1944, published in Industrial and Engineering Chemistry, Analytical Edition, vol. 17, No. 5, May 1945, pages 302–309. The latter paper also correlates the results of such laboratory tests with the so-called standardized "Chevrolet Engine Test."

Essentially, the laboratory test equipment consists of a vertical, thermostatically heated large glass test tube, into which is placed a piece of steel tubing of about one-third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "standard" test the temperature used is approximately the average temperature of the crankcase. The rate of air flow per volume of oil is adjusted to the same as the average for a test engine in operation. Of the catalytic effects those due to iron are the most important. They are empirically duplicated by the addition of a soluble iron salt. Those due to lead-bromide are duplicated by its addition. In the "standard" test, 0.012% of iron salt is added; and in the "iron tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following tables were obtained from tests using:

A 160 cubic centimeter sample of the lubricant composition
70 liters of air per hour
100 square centimeters of steel surface
4.4 square centimeters of copper-lead surface
1.0 square centimeters of copper surface 0.10% by weight of lead bromide powder
0.05% soluble iron calculated as $Fe_2O_3$ in "iron tolerance" test or 0.012% in "standard" test (ferric 2-ethyl hexoate in C. P. benzene)

The "standard" and "iron tolerance" tests were run at 280° F. for 36 hours. The lacquer is deposited on the steel tube and is determined by difference in weight of the tube after washing with chloroform and drying to constant weight. The oil insoluble sludge remaining in the glass tube is thought to be related to similar sludge deposits in engines, and was rated visually against color photographic standards, and appearance rating scale ranging from F (worst) through A (best) being used. The used oil was sufficient to enable the determination of all the usual oil tests, viz. isopentane insolubles, viscosity, acid number, etc.

The products made in accordance with the above two examples were added to an S. A. E. #30 heavy duty base stock comprising conventionally acid treated Mid-Continent base oil plus a Mid-Continent bright stock. This oil containing the additives was compared with a blank, i. e., not containing an additive, by means of the "iron tolerance" test. The results are as follows:

*Table*

| Additive from Example No | None | 7(b) | 8(b) |
|---|---|---|---|
| Concentration of Additive in Per cent by weight (Reaction product per se) | 0 | 3.0 | 4.0 |
| Lacquer deposit in milligrams | 19.3 | 0.3 | 0.6 |
| Sludge (isopentan Insoluble) in milligrams | 823.7 | 66.6 | 0.6 |
| Corrosion (in milligrams per Sq. cm.) Weight loss of copper-lead bearing alloy | 5.2 | 0.2 | 1.1 |
| Acid. No | 8.2 | 1.8 | 1.3 |
| Viscosity Increase (SUS) | 1,051 | 67 | 58 |
| Appearance Rating of Tube | F | A+ | A+ |

It is evident from the foregoing that the additives of the invention markedly improve every indicated characteristic of the lubricating oil.

In order to prevent foaming of oils containing a small proportion of the additives, small amounts of tetra-amyl silicate or an alkyl ortho carbonate, ortho formate or ortho acetate, or a poly-alkyl-silicone oil may advantageously be added.

It will be obvious to one skilled in the art in view of the disclosure that phosphorus sulfide-ketone reaction products and similar products obtained by reacting phosphorus and sulfur with a ketone or as prepared according to different procedures but having substantially the same properties as those herein described, may be converted to metal derivatives, or directly used in accordance with the invention. The invention as claimed contemplates all such compositions within the scope of the appended claims.

The term "consisting essentially of" appearing in the following claims is used to include the specified oil and additive and in addition materials which are conventionally added to lubricating compositions and do not affect the operation of the invention adversely; however, it excludes other substances which would affect the operation of the invention adversely.

I claim:

1. The reaction product of an alkyl ketone having at least 12 carbon atoms with 0.1 to 2.0 moles of a sulfide of phosphorous per mole of the ketone, reacted at a temperature of about 500° F. to produce an oil-dispersible reaction product suitable for improving the stability of lubricating oil against oxidation.

2. A lubricating composition consisting essentially of a mineral oil lubricant for use in vehicles and an amount to improve the stability of said lubricant of the reaction product of an alkyl ketone having at least 12 carbon atoms with 0.1 to 2.0 moles of phosphorus pentasulfide per mole of the ketone, reacted at a temperature of about 500° F. to produce an oil-dispersible reaction product suitable for improving the stability of lubricating oil against oxidation.

3. The reaction product of dipalmityl ketone with from 0.1 to 2.0 moles of a sulfide of phosphorus per mole of the ketone, reacted at a temperature of about 500° F. to produce an oil-dispersible reaction product suitable for improving the stability of a lubricating oil against oxidation.

4. A lubricating composition consisting essentially of a mineral lubricating oil and an amount to improve the stability of said oil of the reaction product of dipalmityl ketone with from 0.1 to 2.0 moles of phosphorus pentasulfide per mole of the ketone, reacted at a temperature of about 500° F., to produce a reaction product which is oil-dispersible and suitable for improving a lubricating oil against oxidation.

EVERETT C. HUGHES.

REFERENCES CITED

The following references are of record in the file of this patent:

UNITED STATES PATENTS

| Number | Name | Date |
|---|---|---|
| 2,242,260 | Prutton | May 20, 1941 |
| 2,383,494 | Moran et al. | Aug. 28, 1945 |
| 2,383,510 | Redman et al. | Aug. 28, 1945 |
| 2,419,153 | Musselman et al. | Apr. 15, 1947 |